(12) United States Patent
Jones

(10) Patent No.: US 8,678,715 B2
(45) Date of Patent: Mar. 25, 2014

(54) AIR COOLED SPACER FOR MULTI-BLADE ABRADING WHEEL

(75) Inventor: Stanley D. Jones, Constantine, MI (US)

(73) Assignee: B&J Rocket America, Inc., Middlebury, IN (US)

( * ) Notice: Subject to any disclaimer, the term of this patent is extended or adjusted under 35 U.S.C. 154(b) by 409 days.

(21) Appl. No.: 12/946,212

(22) Filed: Nov. 15, 2010

(65) Prior Publication Data

US 2012/0118512 A1    May 17, 2012

(51) Int. Cl.
*B23D 77/02*    (2006.01)

(52) U.S. Cl.
USPC .................. 407/29.12; 407/29.13; 407/29.14

(58) Field of Classification Search
USPC ...................... 407/29.11–29.14; 241/DIG. 31
See application file for complete search history.

(56) References Cited

U.S. PATENT DOCUMENTS

| | | | |
|---|---|---|---|
| 2,703,446 A | | 10/1953 | Jensen |
| 3,259,959 A | * | 7/1966 | Tobey ........................ 407/29.12 |
| 3,420,010 A | * | 1/1969 | Tobey ........................... 451/488 |
| 4,019,234 A | | 4/1977 | Jensen et al. |
| 4,021,899 A | | 5/1977 | Jensen |
| 4,059,875 A | | 11/1977 | Jensen |
| 4,091,516 A | | 5/1978 | Jensen et al. |
| 4,843,768 A | | 7/1989 | Stanfield |
| 5,033,175 A | | 7/1991 | Jensen |
| 5,054,177 A | | 10/1991 | Jensen |
| 5,075,942 A | | 12/1991 | Jensen |
| 5,206,977 A | | 5/1993 | Larin |
| 5,283,935 A | | 2/1994 | Jensen |
| 5,461,762 A | | 10/1995 | Jensen |
| 5,504,981 A | | 4/1996 | Jensen et al. |
| 5,647,698 A | | 7/1997 | Jensen |
| 6,554,547 B1 | | 4/2003 | Collins |
| 6,695,547 B2 | | 2/2004 | Collins |
| 6,726,410 B2 | | 4/2004 | Collins |
| 7,341,407 B2 | * | 3/2008 | Boorer ......................... 407/29.1 |
| 7,891,915 B2 | | 2/2011 | Stanfield |
| 2003/0021640 A1 | | 1/2003 | Collins |
| 2007/0286690 A1 | * | 12/2007 | Perez .......................... 407/29.12 |

* cited by examiner

*Primary Examiner* — Daniel Howell
*Assistant Examiner* — Brendan Ayer
(74) *Attorney, Agent, or Firm* — Greer, Burns & Crain, Ltd.

(57) ABSTRACT

An abrading wheel such as a rasp hub for use in tire retreading machines includes two generally circular end, or side, plates with plural spaced mounting pins extending between and coupled to the two spaced plates. Rasp blades arranged in stacks which are arranged end-to-end about the wheel's circular circumference. Disposed between and engaging each pair of adjacent blades is a spacer, which is also attached to the mounting pins. Each spacer is curved lengthwise to match the curvature of the blades and includes plural spaced upper and lower recesses disposed immediately adjacent to its pair of adjacent blades to allow air to freely pass over the entire length of each blade as the hub is rotated at high speed to dissipate heat from the blades during operation for increased blade reliability and longevity.

18 Claims, 4 Drawing Sheets

AIR COOLED SPACER FOR MULTI-BLADE ABRADING WHEEL

FIELD OF THE INVENTION

This invention relates generally to tire retreading machines and is particularly directed to improved rasp hubs for use in tire retreading machines.

BACKGROUND OF THE INVENTION

Tire buffing machines are well known in the tire retreading industry. Conventionally, a tire buffing machine includes both a structure for mounting a used tire and a rasp hub which removes the worn tread from the used tire prior to the retreading process. The used tire is rotated while it is held against the rapidly-rotating rasp hub whose outer perimeter is provided with plural tire rasp blades. When engaged against the used tire, the rasp blades cut or shear small segments of rubber from the worn tread surface area of the tire. In this way, the tire is "buffed" to remove the unwanted used tread and to provide the tire with an evenly-textured surface suitable for retreading.

Tire rasp blades, together with interleaved spacers, are assembled on the periphery of the rasp hub between the hub front and back plates. The back plate is typically provided with plural axially directed support pins for mounting the rasp blades and spacers between the spaced front and back plates. The front plate is then placed on the support pins against the assembled blades and spacers and locked into place. Rasp hubs are typically comprised of five stacked blade sections (wherein each section occupies a 72° circumferential segment) or six stacked blade sections (wherein each section occupies a 60° segment). Thus, each section of the assembled rasp blades is comprised of alternating blades and spacers arranged side-by-side. Furthermore, each section of blades and spacers are angled, or offset, relative to a plane perpendicular to the axis of rotation of the hub to form a cut angle, so that each blade in rotation has an axial cutting swath greater than the width of the blade. The width of a cut swath depends on the cut angle.

During operation, the toothed blades rotating at high speed come into contact and remove the old tread surface of a revolving tire by the rasp blades' cutting and abrading action. But this high speed frictional interaction causes an increase in temperature of the rasp blades. Prolonged exposure to high temperature causes a weakening of the blades and increases the likelihood of blade failure. Blade failure typically involves the breaking off of its teeth or breaking of the blade's body, particularly a portion of the body located adjacent an end of the blade. The likelihood of a substantial increase in the temperature of the rasp hub and, in particular, the blades disposed thereon is increased by the generally closed structure of the rasp hub with the blades and spacers disposed around the hub's outer periphery in a tight fitting arrangement. The present invention operates to reduce the operating temperature of the rasp hub and the blades disposed around its periphery by allowing air to freely circulate through the rasp hub and remove heat from the rasp blades.

OBJECTS AND SUMMARY OF THE INVENTION

Accordingly, it is an object of the present invention to increase the reliability and operating lifetime of plural cutting blades in a rotating cutting assembly by allowing air to freely circulate throughout the cutting assembly thereby substantially reducing the operating temperature of the blades.

It is another object of the present invention to increase the reliability and longevity of the buffing blades in the rasp hub for a tire retreading machine.

The present invention contemplates a multi-blade abrading wheel, or hub, comprising: a hub having first and second side plates adapted for rotation about an axis; plural mounting pins equally angularly spaced about the axis of rotation, each mounting pin having first and second opposed ends, wherein the first end of each mounting pin is attached to the first side plate and the second end of each mounting pin is attached to the second side plate; plural stacks of rasp blades removably attached to the mounting pins, the stacks extending end-to-end about the hub; and plural spacers disposed in each of the plural stacks of rasp blades, wherein each of the spacers is disposed between and engages an adjacent pair of rasp blades for maintaining each of the rasp blades in fixed, rigid position in the hub, wherein each of the spacers is attached to one or more of the mounting pins for maintaining the spacers in fixed position between the first and second side plates, and wherein each spacer includes plural lateral recesses each forming a respective opening with an adjacent rasp blade to allow for unrestricted flow of air between each spacer and an adjacent rasp blade for removing heat from the rasp blades during operation.

The present invention further contemplates a spacer for use in a tire retreading hub adapted for high speed rotation and having plural stacks of elongated rasp blades, wherein the rasp blades are disposed between and securely attached to first and second side plates by means of plural spaced mounting pins disposed between and connected to the first and second side plates, and plural spacers each disposed between and engaging a pair of adjacent rasp blades for maintaining the rasp blades in fixed, rigid position in the hub, each of the spacers comprising: an elongated, generally flat, arc-shaped body comprised of a heat conducting material having a longitudinal axis aligned generally with a longitudinal axis of each of the adjacent rasp blades, the body including plural spaced apertures through each of which is inserted in a tight-fitting manner a respective one of the mounting pins for attaching said body to the hub; and a peripheral flange formed on an outer edge of the elongated, generally flat body and extending outwardly in a direction generally transverse to a plane of the flat body; wherein the peripheral flange includes alternating spaced extended portions and recessed portions disposed about the outer edge of the body, wherein the extended portions engage rasp blades disposed adjacent to the body and the recessed portions form openings between the body and a pair of adjacent rasp blades to allow for unrestricted flow of air between the body and each adjacent rasp blade for removing heat from the rasp blades during operation.

BRIEF DESCRIPTION OF THE DRAWINGS

The appended claims set forth those novel features which characterize the invention. However, the invention itself, as well as further objects and advantages thereof, will best be understood with reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
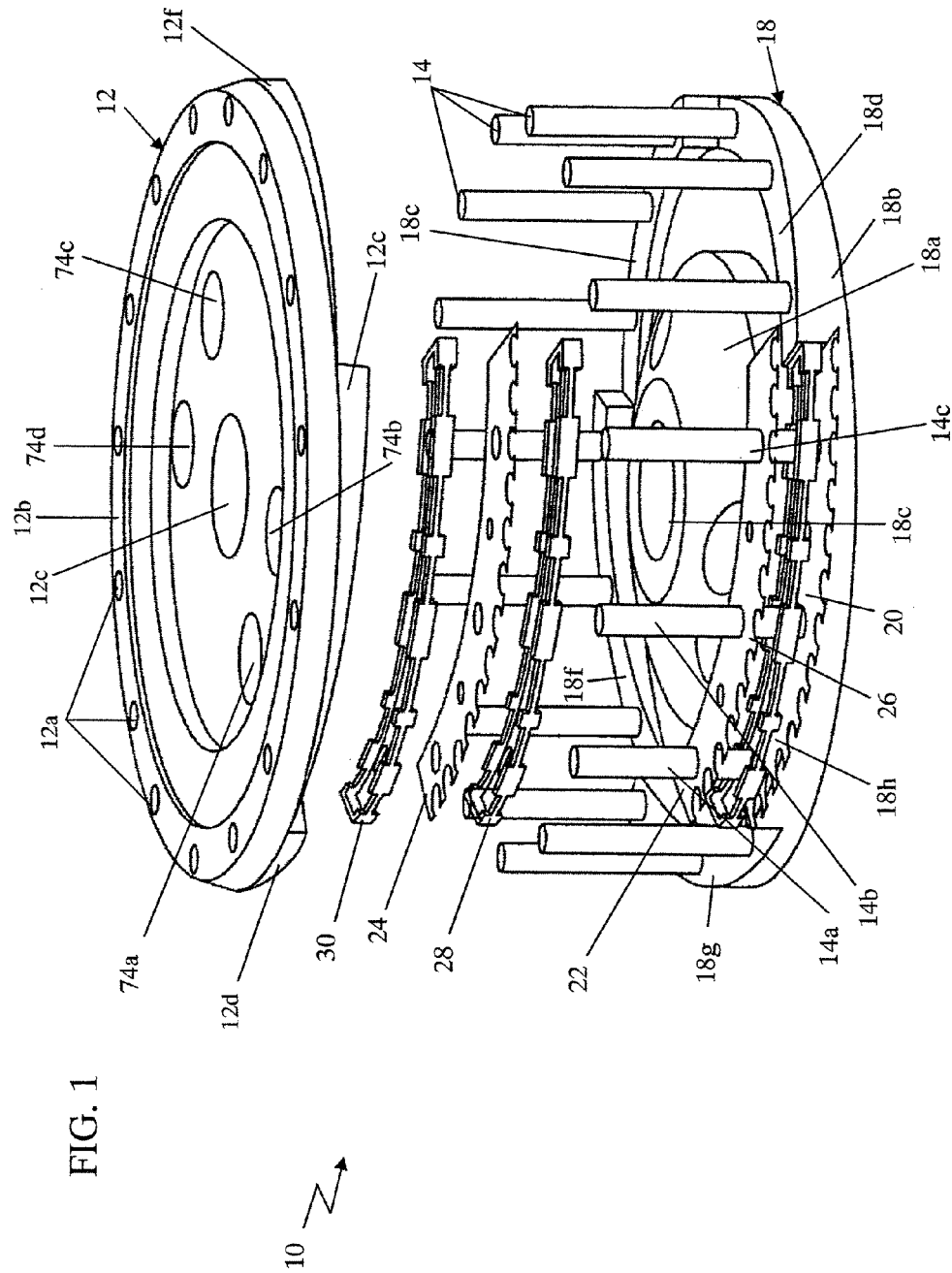
FIG. 1 is a partial exploded perspective view of a multi-blade rasp hub, or abrading wheel, in accordance with the principles of the present invention.
Figure 2:
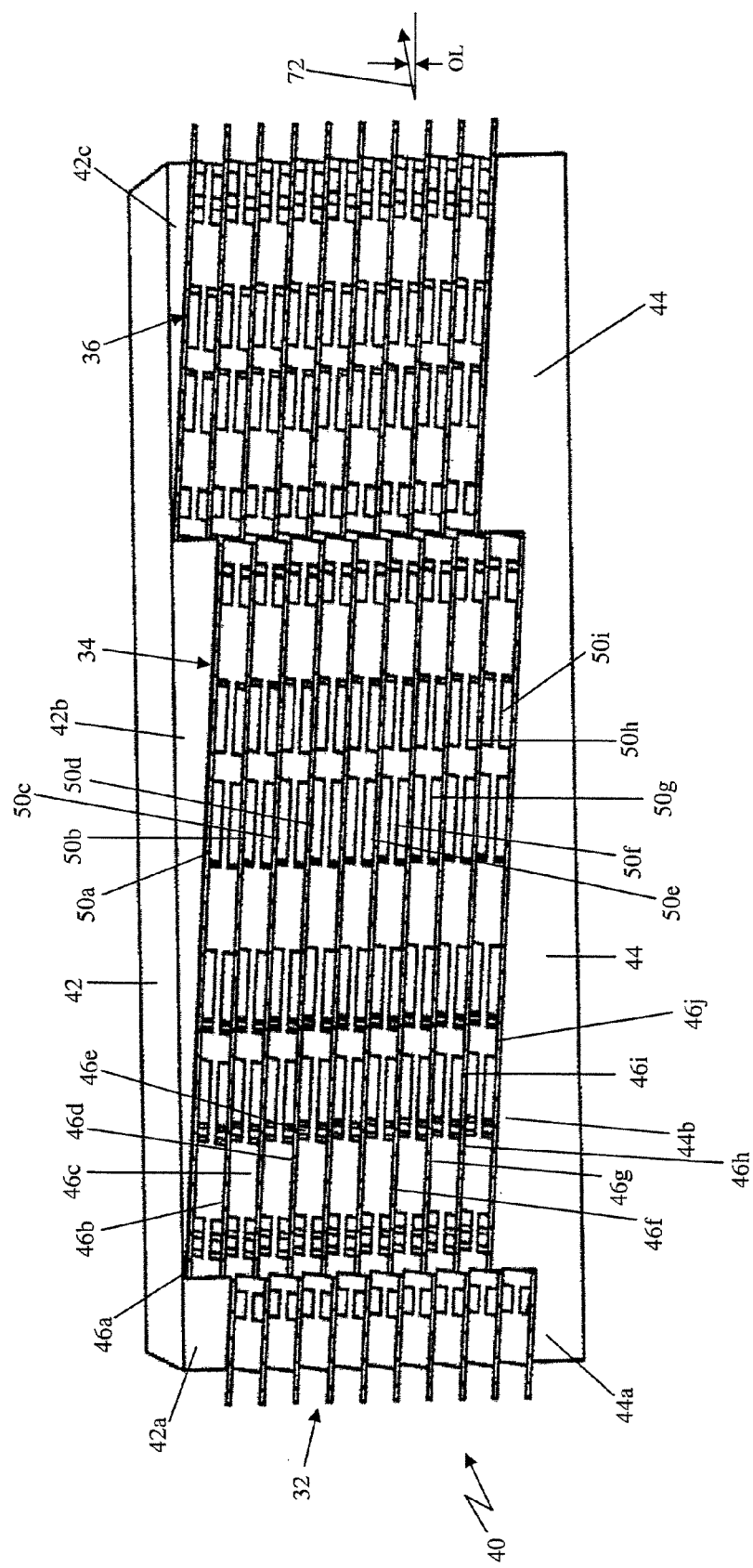
FIG. 2 is a plan view of a multi-blade abrading wheel in accordance with the present invention illustrating details of the positioning of the rasp blades and spacers in the wheel.

Referring to FIG. 1, there is shown a partial exploded perspective view of a multi-blade abrading wheel 10 incorporating plural inter-blade spacers, where three of these spacers are shown as elements 26, 28 and 30 in accordance with the principles of the present invention. FIG. 2 is a side plan view of an assembled multi-blade abrading wheel 40 illustrating the positions of the cutting blades and spacers within the abrading wheel. From FIG. 2, it can be seen that the multi-blade abrading wheel 10 includes a large number of cutting blades and spacers, while only three cutting blades 20, 22 and 24 and dime spacers 26, 28 and 30 are show in FIG. 1 for the sake of simplicity.

Abrading wheel 10 includes first and second hub end plates 12 and 18. The inner surface of each of the first and second end plates 12, 18 is provided with five spaced inclined segments disposed about their respective peripheral portions. Thus, as shown for the second end plate 18, first through fifth peripheral inclined segments 18d-18h are disposed about the inner, peripheral surface of the end plate. Only three such peripheral inclined segments 12d, 12e and 12f are shown on the inner surface of the first end hub 12 for the sake of simplicity, it being understood that this end plate is also provided with five spaced, peripheral, inclined segments. Also disposed about the outer periphery of each of the first and second end plates 12, 18 are plural spaced apertures extending through the end plate. Thus, plural apertures 12a are shown in FIG. 1 disposed about the outer periphery of the first end plate 12, while corresponding apertures disposed about the outer periphery of the second end plate 18 are not shown for the sake of simplicity. The first and second end plates 12, 18 are disposed within the abrading wheel 10 in a generally parallel, spaced manner, with their respective peripheral apertures in common alignment. Alignment of these apertures allows plural mounting pins 14 to be inserted in corresponding aligned apertures in the first and second end plates 12, 18 in assembling abrading wheel 10.

In assembling the multi-blade abrading wheel 10, each of the plural mounting pins 14 is inserted into a respective one of the peripheral apertures in the second end plate 18 as shown in FIG. 1. Each of the mounting pins 14 is securely attached to the second end plate 18 in a conventional manner such as by weldments. With the mounting pins 14 securely attached to the second end plate 18, plural spaced rasp blades 30 each having three spaced apertures therein are positioned over three adjacent mounting pins and slid into position on one of the peripheral inclined segments 18d-18h of the second end plate. Thus, as shown in FIG. 1, a first rasp blade 20 having three spaced apertures therein is positioned on mounting pins 14a, 14b and 14c and is moved into contact with peripheral inclined segment 18h disposed on the inner, peripheral surface of the second end plate 18. With the first blade 20 in position on the peripheral inclined segment 18h of the second end plate 18, a first spacer 26 also having three spaced apertures is positioned in engagement with the first, second and third mounting pins 14a, 14b and 14c and is moved into place in contact with the upper surface of the first rasp blade 20 as shown in FIG. 1. This is followed by the sequential positioning of a second rasp blade 22, a second spacer 28, a third rasp blade 24, and a third spacer 30 also as shown in FIG. 1. This alternate positioning of rasp blades and spacers on the three spaced, aligned mounting pins 14a, 14b and 14c continues until the specified number of blade and spacer combinations is positioned upon the mounting pins. This sequential positioning of blades and spacers in an alternating manner is also carried out with respect to the remaining peripheral inclined segments disposed about the inner surface of the second end plate 18.

When the prescribed number of blade and spacer combinations are positioned about the outer periphery of the second end plate 18 and in engagement with the peripheral mounting pins 14, the first end plate 12 is positioned in alignment with the mounting pins which are each inserted into a respective peripheral aperture 12a within the first end plate. As in the case of the second end plate 18, the first end plate 12 is then securely attached to the upper ends of the mounting pins 14 by conventional means such as weldments. It is in this manner that plural combinations of alternating blades and spacers are positioned in a fixed, secure manner between and about the respective inner peripheries of the first and second end plates 12, 18. Because of the five peripheral inclined segments described above which are disposed about the respective inner peripheries of the first and second end plates 12, 18, the blade and spacer combinations are oriented at an inclined angle relative to a direction of rotation of the multi-blade abrading wheel. Thus, as shown for the multi-blade abrading wheel 40 illustrated in FIG. 2, the stacks of blade and spacer combinations are oriented at an angle α relative to a direction of rotation indicated by arrow 72 of the abrading wheel 40.

FIG. 2 shows all or part of three of the five stacked arrays 32, 34 and 36 of blades and spacers disposed between first and second end plates 42 and 44. The first end plate 42 is shown as including first, second and third peripheral inclined segments 42a, 42b and 42c. Similarly, second end plate 44 is shown as including third, fourth and fifth peripheral inclined segments 44a, 44b and 44c. The first stacked array 32 is disposed between peripheral inclined segments 42a and 44a. The second stacked array 34 is disposed between peripheral inclined segments 42b and 44b. The third stacked array 36 is disposed between peripheral inclined segments 42c and 44c. With reference specifically to the second stacked array 34, first through tenth cutting blades 46a-46j are positioned in an alternating manner with first through ninth air cooled spacers 50a-50i between peripheral inclined segments 42b and 44b of the first and second end plates 42, 44, respectively.

Referring again to FIG. 1, it can be seen that the inner surface of the second end plate 18 is provided with an upraised inner portion 18a having a circular aperture 18c therein. Similarly, the first end plate 12 is provided with a corresponding upraised inner portion (not shown in the figure for simplicity) having a circular aperture 12c therein. Apertures 12c and 18c are in mutual alignment and are adapted to receive in a tight-fitting manner a cylindrical drive shaft connected to a conventional rotary drive, which combination is not shown in the figures for simplicity.

Figure 3:
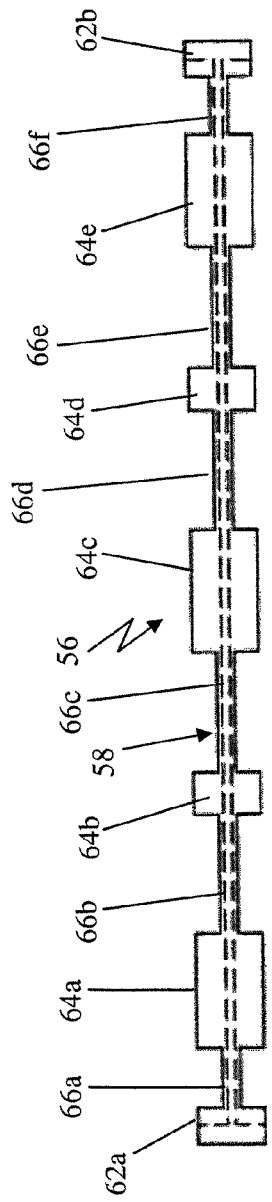
FIG. 3 is a top plan view of a spacer adapted for positioning between and in engagement with a pair of rasp blades in accordance with the present invention.
Figure 4:
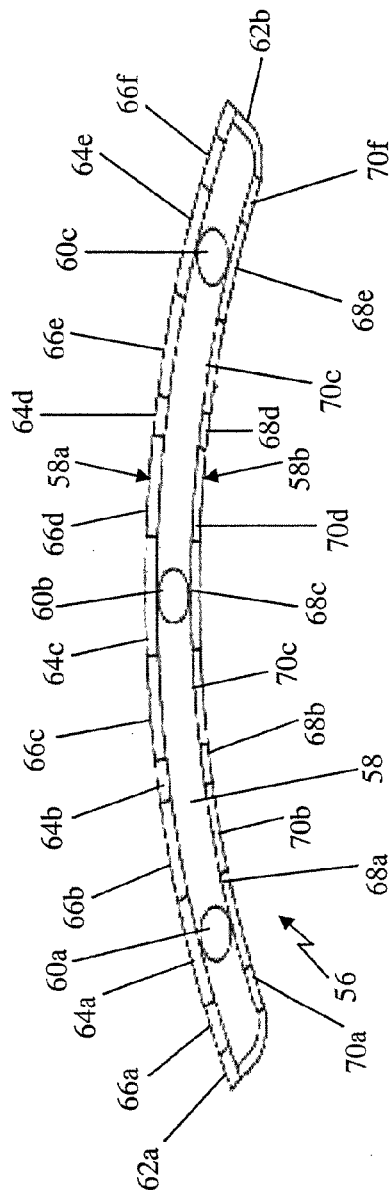
FIG. 4 is a side elevation view of the blade spacer shown in FIG. 3.
Figure 5:
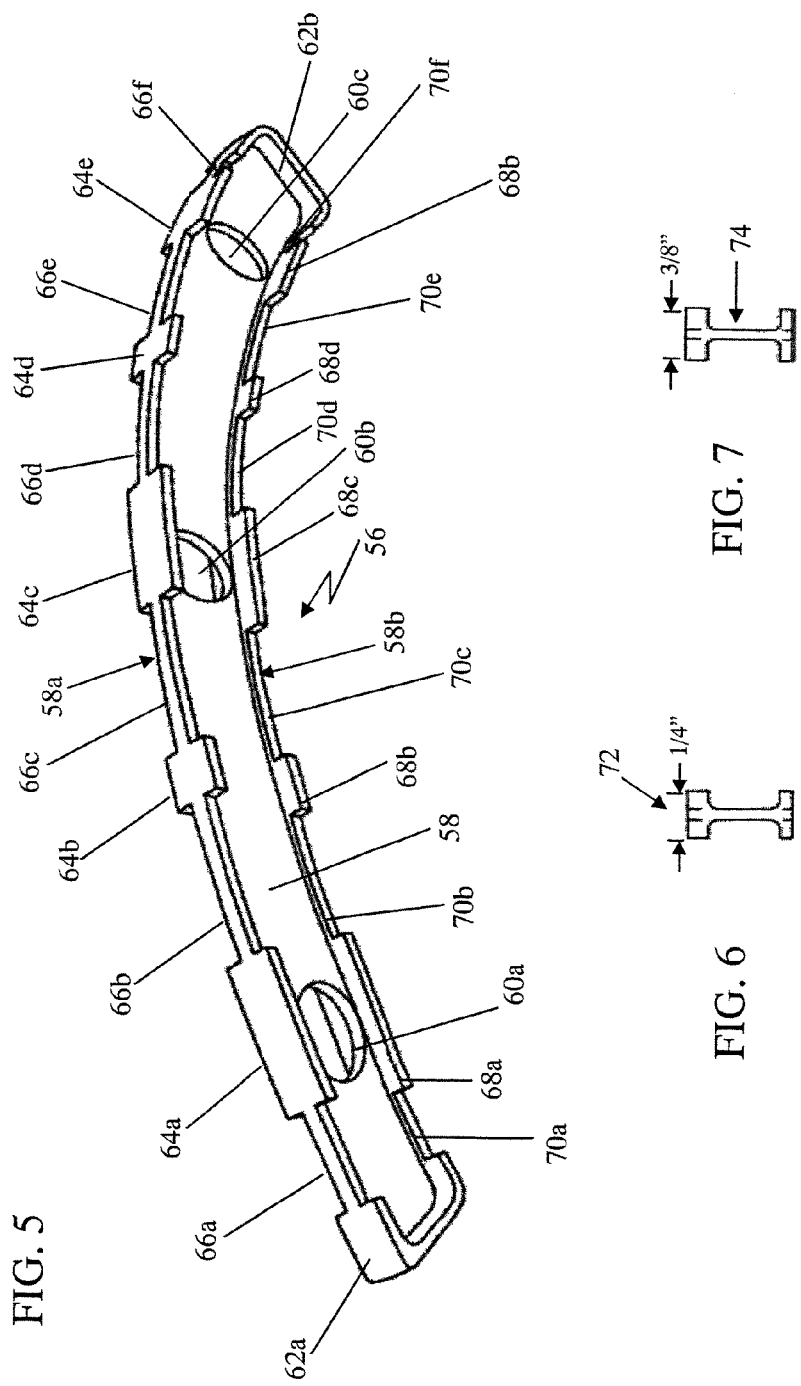
FIG. 5 is a perspective view of the blade spacer shown in FIGS. 3 and 4.
Figure 7:
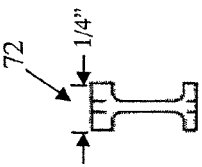
FIGS. 6 and 7 are respectively sectional views of cutting blade spacers of ¼" and ⅜" widths.
Figure 6:
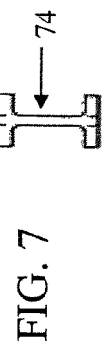

Referring to FIGS. 3 and 4, there are respectively shown top plan and side elevation views of an air cooled spacer 56 in accordance with the present invention. Air cooled spacer 56 is arc-shaped, subtending an angle on the order of 72° in one embodiment. Air cooled spacer 56 further includes three spaced, generally circular apertures 60a, 60b and 60c disposed along its length. Each of the three apertures 60a, 60b and 60c is adapted to receive a respective mounting pin in a tight-fitting manner as described above. Air cooled spacer 56 has a cross section in the general shape of an I-beam, as it includes outer and inner flanges 58a and 58b which extend laterally outward from the inner, flat body 58 of the spacer.

Disposed on opposed ends of air cooled spacer 56 are first and second end flanges 62a and 62b which also extend laterally outward from the spacer's inner body 58. The outer edges of the spacer's end flanges 62a, 62b engage adjacent end portions of a pair of adjacent rasp blades for maintaining the blade end portions in fixed position and preventing bending of the blade. In a preferred embodiment, the first and second end flanges 62a, 62b are continuous with and formed integrally with the outer and inner flanges 58a, 58b and all of the flanges are formed integrally with the flat body 58 of the spacer 56 to provide a unitary, single piece structure.

Disposed on an outer edge portion of air-cooled spacer 56 and extending outwardly from its outer flange 58a are plural outer lateral extensions 64a-64e. Similarly, disposed on and extending outwardly from the spacer's inner flange 58b and extending laterally outward therefrom are plural spaced inner lateral extensions 68a-68e. The outer edge portions of each of the outer lateral extensions 64a-64e and inner lateral extensions 68a-69e are positioned in abutting contact with adjacent rasp blades for maintaining the blades along their entire lengths in fixed position, thereby preventing bending of the blade. Disposed between each adjacent pair of outer and inner lateral extensions are a pair of recessed portions, each disposed on a respective side of the air-cooled spacer 56. Thus, pairs of outer recessed portions 66a-66f are disposed in a spaced manner along the length of the spacer's outer flange 58a, while pairs of inner recessed portions 70a-70f are disposed between adjacent inner lateral extensions 68a-68e and extend along the length of the spacer 56 in a spaced manner. Pairs of outer and inner recessed portions 66a and 70a are disposed between opposed ends of the spacer's first end flange 62a and outer and inner lateral extensions 64a and 68a, respectively. Similarly, a pair of recessed portions 66f and 70f are disposed between adjacent ends of the spacer's second end flange 62b and the fifth outer lateral extension 64e and the sixth inner lateral extension 68e.

The first through sixth outer recessed portions 66a-66f and the first through sixth inner recessed portions 70a-70f respectively disposed on the outer and inner flanges 58a and 58b of the air cooled spacer 56 allow air to freely move between each spacer and an adjacent cutting blade(s) for cooling the cutting blades during operation. This cooling effect reduces the operating temperature of the blades caused by friction between the blades and the tire work piece. Air flows freely through the multi-blade abrading wheel 10 through its outer circumference in radial directions relative to the rotating abrading wheel. In addition, each of the first and second end plates 12, 18 is provided with plural non-axial apertures 74a-74d as shown for the case of the first end plate 12 in FIG. 1. Non-axial apertures 74a-74d further increase the amount of air flow within the abrading wheel 10 and between each blade and its associated spacer(s). This increased air flow reduces the operating temperature of each of the rasp blades, increasing their reliability during operation and the longevity of each blade in accordance with the present invention.

While particular embodiments of the present invention have been described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matters set forth in the foregoing description and accompanying drawings is offered by way of illustration only and not as a limitation.

I claim:

1. Apparatus for use in retreading tires, comprising:
a hub having first and second side plates adapted for rotation about an axis;
plural mounting pins equally angularly spaced about said axis of rotation, each mounting pin having first and second opposed ends, wherein the first end of each mounting pin is attached to said first side plate and the second end of each mounting pin is attached to said second side plate:
plural stacks of rasp blades removably attached to said mounting pins, said stacks extending end-to-end about said hub; and
plural spacers disposed in each of said plural stacks of rasp blades, wherein each of said spacers is disposed between and engages an adjacent pair of rasp blades for maintaining each of said rasp blades in fixed, rigid position in said hub, wherein each of said spacers is attached to one or more of said mounting pins for maintaining said spacers in fixed position between said first and second side plates, and wherein each spacer includes plural lateral recesses each forming a respective opening with an adjacent rasp blade to allow for unrestricted flow of air between each spacer and an adjacent rasp blade for removing heat from the rasp blades during operation, with each spacer including a generally flat body having a peripheral flange disposed on its outer edge and extending outwardly from said outer edge in a direction generally transverse to said flat body, said peripheral flange including alternating spaced projections engaging adjacent rasp blades and recesses allowing for air flow between adjacent rasp blades and spacers.

2. The apparatus of claim 1, wherein each of said first and second side plates includes respective plural apertures for allowing for the free flow of air through said hub and said stacks of rasp blades.

3. The apparatus of claim 1, wherein each of said spacers includes plural spaced apertures disposed along its length, wherein each of said apertures is adapted to receive one of said mounting pins in a tight-fitting manner for securely maintaining said plural spacers in fixed position between said first and second side plates.

4. The apparatus of claim 1, wherein each of said spacers and each of said rasp blades is arc-shaped.

5. The apparatus of claim 4, wherein each of said spacers and each of said rasp blades subtends an arc on the order of 60° or 72°.

6. The apparatus of claim 5, wherein said first and second side plates are generally circular, with said mounting pins attached to each of said first and second side plates about their respective outer peripheries.

7. The apparatus of claim 6, wherein each of said plural stacks of rasp blades is arc-shaped, with five stacks of rasp blades arranged end-to-end and extending 360° around the outer peripheries of said first and second plates.

8. The apparatus of claim 1, wherein each of said spacers is generally flat and is aligned generally in parallel with its adjacent pair of rasp blades, and wherein said spacers and rasp blades are arc-shaped and subtend substantially the same angular span.

9. The apparatus of claim 1, wherein a portion of said peripheral flange adjacent each of said apertures in a spacer includes at least one projection for providing increased strength for the spacer adjacent each of said apertures therein.

10. The apparatus of claim 9, wherein each of said spacers has a unitary structure comprised of a heat conducting material.

11. The apparatus of claim 10, wherein said heat conducting material is aluminum.

12. Spacers for use in a tire retreading hub adapted for high speed rotation and having plural stacks of elongated rasp blades, wherein said rasp blades are disposed between and securely attached to first and second side plates by means of plural spaced mounting pins disposed between and connected to said first and second side plates, and plural spacers each disposed between and engaging a pair of adjacent rasp blades for maintaining said rasp blades in fixed, rigid position in said hub, each of said spacers comprising:

an elongated, generally flat, arc-shaped body comprised of a heat conducting material having a longitudinal axis aligned generally with a longitudinal axis of each of said adjacent rasp blades, said body including plural spaced apertures through each of which is inserted in a tight-fitting manner a respective one of said mounting pins for attaching said body to said hub; and a peripheral flange formed on an outer edge of said elongated, generally flat body and extending outwardly in a direction generally transverse to a plane of said flat body;

wherein said peripheral flange includes alternating spaced extended portions and recessed portions disposed about the outer edge of said body, wherein said extended portions engage rasp blades disposed adjacent to said body and said recessed portions form openings between said body and a pair of adjacent rasp blades to allow for unrestricted flow of air between said body and each adjacent rasp blade for removing heat from the rasp blades during operation.

13. The spacer of claim 12, wherein said body and said peripheral flange form a unitary structure.

14. The spacer of claim 13, wherein said unitary structure is comprised of aluminum.

15. The spacer of claim 12, wherein extended portions of said peripheral flange are disposed adjacent each of said apertures in said elongated body for increasing the strength of said elongated body adjacent to where said elongated body is coupled to a mounting pin.

16. The spacer of claim 15, wherein said arc-shaped body subtends an arc on the order of 60° or 72°.

17. The apparatus of claim 16, wherein the peripheral flange of said spacer has a width on the order of ¼" or ⅜".

18. The spacer of claim 17, wherein the extended portions of said peripheral flange extend outwardly from opposing sides of said generally flat body and each of said extended portions includes opposed outer flat edges, each adapted to engage in adjacent rasp blade.

* * * * *